US012586718B2

(12) United States Patent (10) Patent No.: US 12,586,718 B2
Park et al. (45) Date of Patent: Mar. 24, 2026

(54) MULTILAYER CERAMIC ELECTRONIC COMPONENT

(71) Applicant: SAMSUNG ELECTRO-MECHANICS CO., LTD., Suwon-si (KR)

(72) Inventors: Sehun Park, Suwon-si (KR); Moonchul Lee, Suwon-si (KR); Sung-Min Cho, Suwon-si (KR); Taejoon Park, Suwon-si (KR)

(73) Assignee: SANMSUNG ELECTRO-MECHANICS CO., LTD., Suwon-si (KR)

( * ) Notice: Subject to any disclaimer, the term of this patent is extended or adjusted under 35 U.S.C. 154(b) by 146 days.

(21) Appl. No.: 18/422,743

(22) Filed: Jan. 25, 2024

(65) Prior Publication Data

US 2025/0069806 A1 Feb. 27, 2025

(30) Foreign Application Priority Data

Aug. 23, 2023 (KR) ........................ 10-2023-0110261

(51) Int. Cl.
*H01G 4/008* (2006.01)
*H01G 4/12* (2006.01)
*H01G 4/30* (2006.01)
(52) U.S. Cl.
CPC ............... *H01G 4/008* (2013.01); *H01G 4/12* (2013.01); *H01G 4/30* (2013.01)
(58) Field of Classification Search
CPC ............. H01G 4/008; H01G 4/12; H01G 4/30
See application file for complete search history.

(56) References Cited

U.S. PATENT DOCUMENTS

| | | | |
|---|---|---|---|
| 4,247,881 A | 1/1981 | Coleman | |
| 11,282,647 B2 | 3/2022 | Muramatsu | |
| 2014/0247534 A1* | 9/2014 | Sato ......................... | H01G 4/30 |
| | | | 361/278 |
| 2015/0090485 A1* | 4/2015 | Lee ......................... | H01G 4/232 |
| | | | 361/301.4 |
| 2017/0148571 A1* | 5/2017 | Akada ..................... | H01G 4/232 |
| 2019/0027312 A1* | 1/2019 | Muramatsu .............. | H01G 4/12 |
| 2020/0126719 A1* | 4/2020 | Lee ......................... | H01G 4/232 |
| 2021/0043383 A1* | 2/2021 | Lee ......................... | H01G 4/224 |
| 2022/0165503 A1 | 5/2022 | Muramatsu | |
| 2022/0328251 A1* | 10/2022 | Okada .................... | H01G 4/012 |

FOREIGN PATENT DOCUMENTS

| | | | |
|---|---|---|---|
| JP | 7092052 B | 6/2022 | |
| KR | 10-1990-00086560 A | 6/1990 | |

* cited by examiner

*Primary Examiner* — Michael P Mcfadden
(74) *Attorney, Agent, or Firm* — Morgan, Lewis & Bockius LLP

(57) ABSTRACT

A disclosed multilayer ceramic electronic component includes: a stacked body that includes a plurality of dielectric layers stacked in a first direction and a plurality of internal electrodes stacked in the first direction; and a first external electrode, a second external electrode, a third external electrode, and a fourth external electrode that are disposed outside the stacked body. The plurality of internal electrodes includes a plurality of first internal electrodes connected to the first external electrode and the second external electrode and a plurality of second internal electrodes connected to the third external electrode and the fourth external electrode, and an edge of a cross-section of the stacked body that intersects the first direction is a curve.

18 Claims, 10 Drawing Sheets

--RELATED ART--

MULTILAYER CERAMIC ELECTRONIC COMPONENT

CROSS-REFERENCE TO RELATED APPLICATION

This application claims priority to and the benefit of Korean Patent Application No. 10-2023-0110261 filed at the Korean Intellectual Property Office on Aug. 23, 2023, the entire contents of which are incorporated herein by reference.

BACKGROUND

(a) Field

The present disclosure relates to a multilayer ceramic electronic component.

(b) Description of the Related Art

An electronic component that uses a ceramic material includes a capacitor, an inductor, a piezoelectric element, a varistor, a thermistor, or the like. A multilayer ceramic capacitor (MLCC) among the ceramic electronic component may be used in various electronic devices due to its advantages of being small, high-capacity, and easy to mount.

For example, the multilayer ceramic capacitor may be mounted on substrates of various electronic products such as an imaging device such as a liquid crystal display device (LCD), a plasma display device panel (PDP), an organic light emitting diode (OLED), or the like, a computer, a personal portable terminal, and a smartphone so that the multilayer ceramic capacitor is used as a chip-type condenser that plays a role in charging or discharging electricity therein or therefrom.

The multilayer ceramic capacitor may generally have a rectangular parallelepiped shape, and the structure may include a portion (a corner, a vertex, or the like) that is weak to an external impact so that there is a problem in which a crack occurs in the structure or the structure breaks.

SUMMARY

One aspect of an embodiment is to provide a multilayer ceramic electronic component that is resistant to an external impact.

However, problems to be solved by embodiments of the present disclosure are not limited to the above-described problem and may be variously extended in a range of a technical idea included in the present disclosure.

A multilayer ceramic electronic component according to an embodiment includes: a stacked body that includes a plurality of dielectric layers stacked in a first direction and a plurality of internal electrodes stacked in the first direction; and a first external electrode, a second external electrode, a third external electrode, and a fourth external electrode that are disposed outside the stacked body. The plurality of internal electrodes includes a plurality of first internal electrodes connected to the first external electrode and the second external electrode and a plurality of second internal electrodes connected to the third external electrode and the fourth external electrode, and an edge of a cross-section of the stacked body that intersects the first direction is a curve.

The stacked body may include a first surface and a second surface facing in the first direction and a third surface connecting the first surface and the second surface, and the third surface may be a curved surface. At least one of a boundary between the first surface and the third surface and a boundary between the second surface and the third surface may be a round shape.

The stacked body may have a circular cylinder or elliptic cylinder shape.

The first external electrode, the second external electrode, the third external electrode, and the fourth external electrode may be disposed on the third surface of the stacked body.

At least one of the first external electrode, the second external electrode, the third external electrode, and the fourth external electrode may extend onto a portion of at least one of the first surface and the second surface of the stacked body.

The first external electrode, the second external electrode, the third external electrode, and the fourth external electrode may be disposed at equal intervals.

The stacked body may include a structure in which the plurality of first internal electrodes and the plurality of second internal electrodes are alternately stacked with the respective dielectric layers interposed therebetween.

One of the first internal electrodes may include a first electrode main body and a first lead portion and a second lead portion that are disposed at an edge of the first electrode main body and are spaced apart from each other, and each of the second internal electrodes may include a second electrode main body and a third lead portion and a fourth lead portion that are disposed at an edge of the second electrode main body and are spaced apart from each other.

The first lead portion may be connected to the first external electrode and the second lead portion may be connected to the second external electrode, and the third lead portion may be connected to the third external electrode and the fourth lead portion may be connected to the fourth external electrode.

The first lead portion and the second lead portion may be disposed at equal intervals.

The third lead portion and the fourth lead portion may be disposed at equal intervals.

The multilayer ceramic electronic component may further include a fifth external electrode and a sixth external electrode, in which the one of the first internal electrodes may further include a fifth lead portion and a sixth lead portion that are disposed at the edge of the first electrode main body and are spaced apart from the first lead portion and the second lead portion, and the fifth lead portion is connected to the fifth external electrode and the sixth lead portion is connected to the sixth external electrode.

When the first electrode main body and the second electrode main body are viewed from the first direction, the first electrode main body and the second electrode main body may have a circular or elliptical shape.

Each of the first external electrode and the second external electrode may include a first metal layer connected to the plurality of first internal electrodes, a second metal layer covering the first metal layer, and a third metal layer covering the second metal layer, and each of the third external electrode and the fourth external electrode may include a first metal layer connected to the plurality of second internal electrodes, a second metal layer covering the first metal layer, and a third metal layer covering the second metal layer.

The first metal layer may include copper (Cu), the second metal layer may include nickel (Ni), and the third metal layer may include tin (Sn).

A multilayer ceramic electronic component according to another embodiment includes: a stacked body having a cylindrical shape and including a plurality of dielectric layers stacked in a first direction and a plurality of internal electrodes stacked in the first direction; and a first external electrode, a second external electrode, a third external electrode, and a fourth external electrode that are disposed outside the stacked body. The plurality of internal electrodes includes a plurality of first internal electrodes connected to the first external electrode and the second external electrode and a plurality of second internal electrodes connected to the third external electrode and the fourth external electrode.

One of the first internal electrodes includes a first electrode main body and a first lead portion and a second lead portion that are disposed at an edge of the first electrode main body and are spaced apart from each other, and each of the second internal electrodes includes a second electrode main body and a third lead portion and a fourth lead portion that are disposed at an edge of the second electrode main body and are spaced apart from each other.

The first lead portion is connected to the first external electrode and the second lead portion is connected to the second external electrode, and the third lead portion is connected to the third external electrode and the fourth lead portion is connected to the fourth external electrode.

The multilayer ceramic electronic component may further include a fifth external electrode and a sixth external electrode that are spaced apart from each of the first, second, third, and fourth external electrodes. The one of the first internal electrodes further includes a fifth lead portion and a sixth lead portion that are disposed at the edge of the first electrode main body and are spaced apart from the first lead portion and the second lead portion, and the fifth lead portion is connected to the fifth external electrode and the sixth lead portion is connected to the sixth external electrode.

According to a multilayer ceramic electronic component according to the embodiment, a stacked body may be resistant to an external impact.

DETAILED DESCRIPTION OF THE EMBODIMENTS

Figure 1:
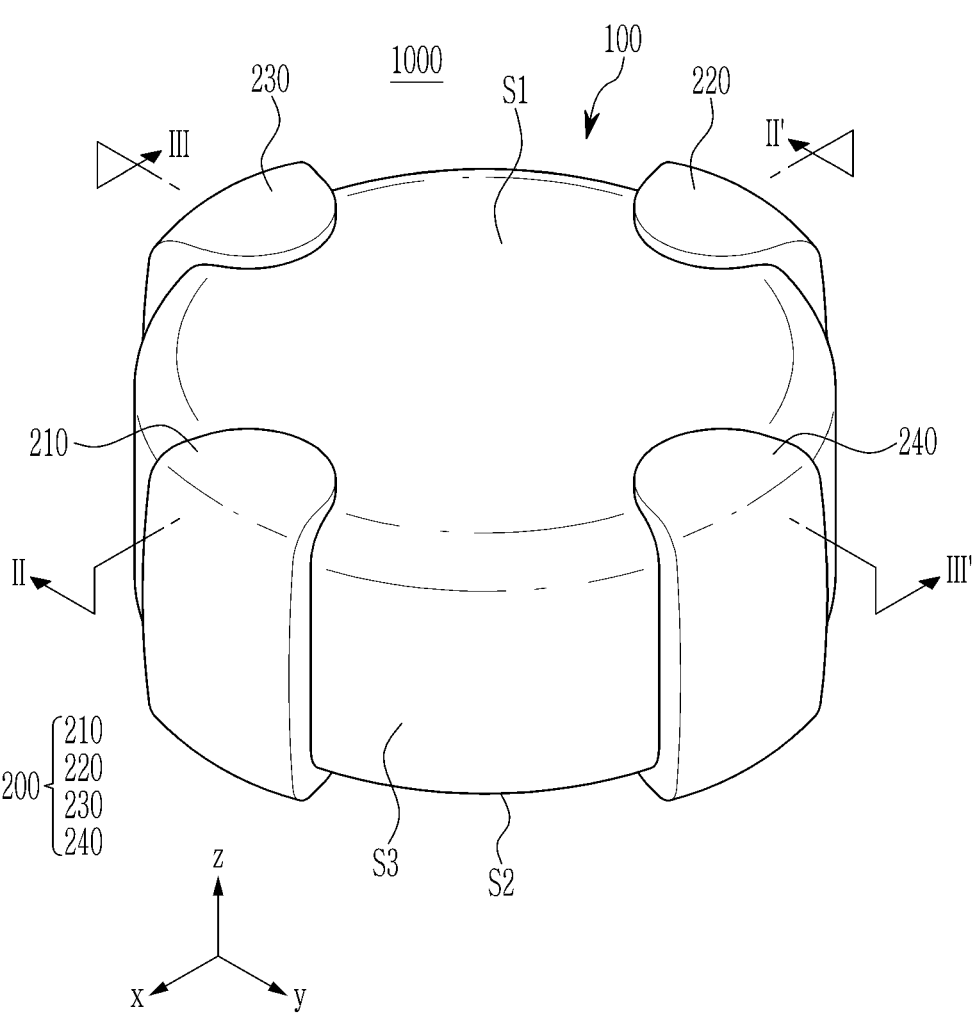
FIG. 1 is a perspective view schematically showing a multilayer ceramic electronic component according to an embodiment.

Hereinafter, various embodiment of the present disclosure will be described in detail so that a person of ordinary skill in the technical field to which the present disclosure belongs can easily implement it with reference to the accompanying drawings. In order to clearly describe the present disclosure, parts or portions that are irrelevant to the description are omitted in the drawings, and identical or similar constituent elements throughout the specification are denoted by the same reference numerals. In addition, some constituent elements in the accompanying drawings are exaggerated, omitted, or schematically illustrated, and the size of each constituent element does not fully reflect the actual size.

The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from other components.

It will be understood that when an element such as a layer, film, region, area, or substrate is referred to as being "on" or "above" another element, it may be directly on the other element or intervening elements may also be present.

In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

It will be further understood that terms "comprises/includes" or "have" used throughout the specification specify the presence of stated features, numerals, steps, operations, components, parts, or a combination thereof, but do not preclude the presence or addition of one or more other features, numerals, steps, operations, components, parts, or a combination thereof. Accordingly, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Furthermore, throughout the specification, "connected" does not only mean when two or more elements are directly connected, but also when two or more elements are indirectly connected through other elements, and when they are physically connected or electrically connected, and further, it may be referred to by different names depending on a position or function, and may also be referred to as a case in which respective parts that are substantially integrated are linked to each other.

Figure 2:
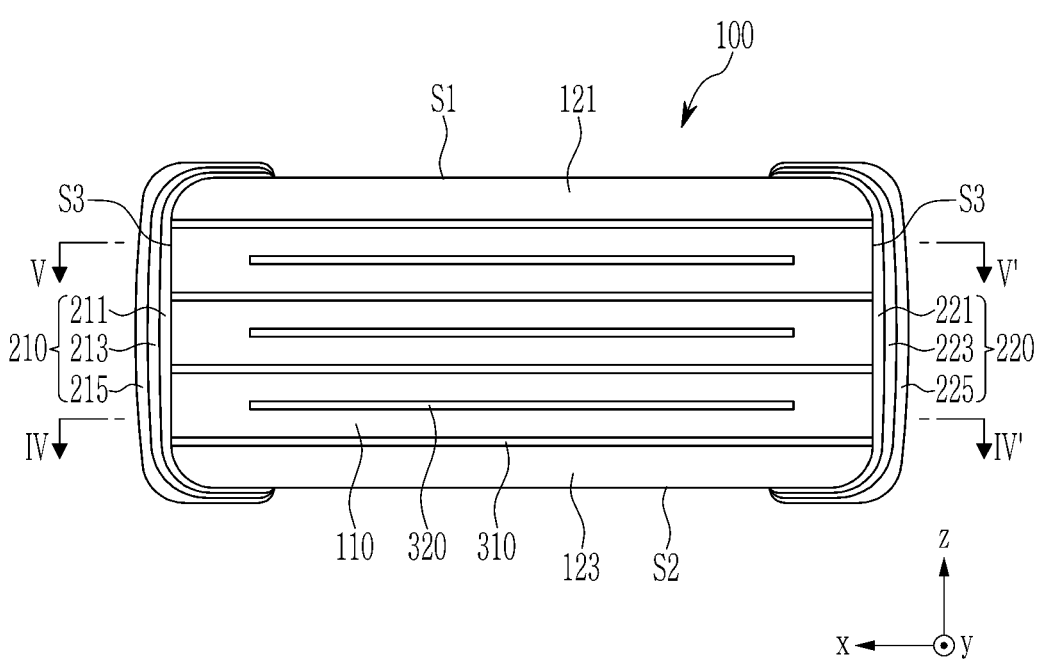
FIG. 2 is a cross-sectional view taken along line II-II' of FIG. 1.
Figure 3:
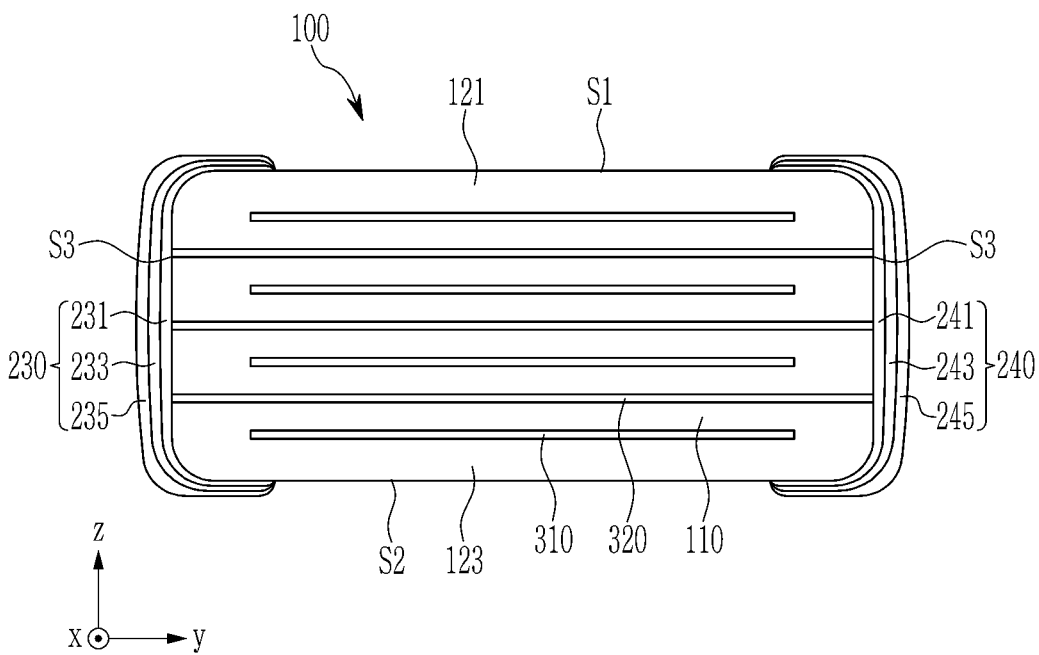
FIG. 3 is a cross-sectional view taken along line III-III' of FIG. 1.
Figure 4:
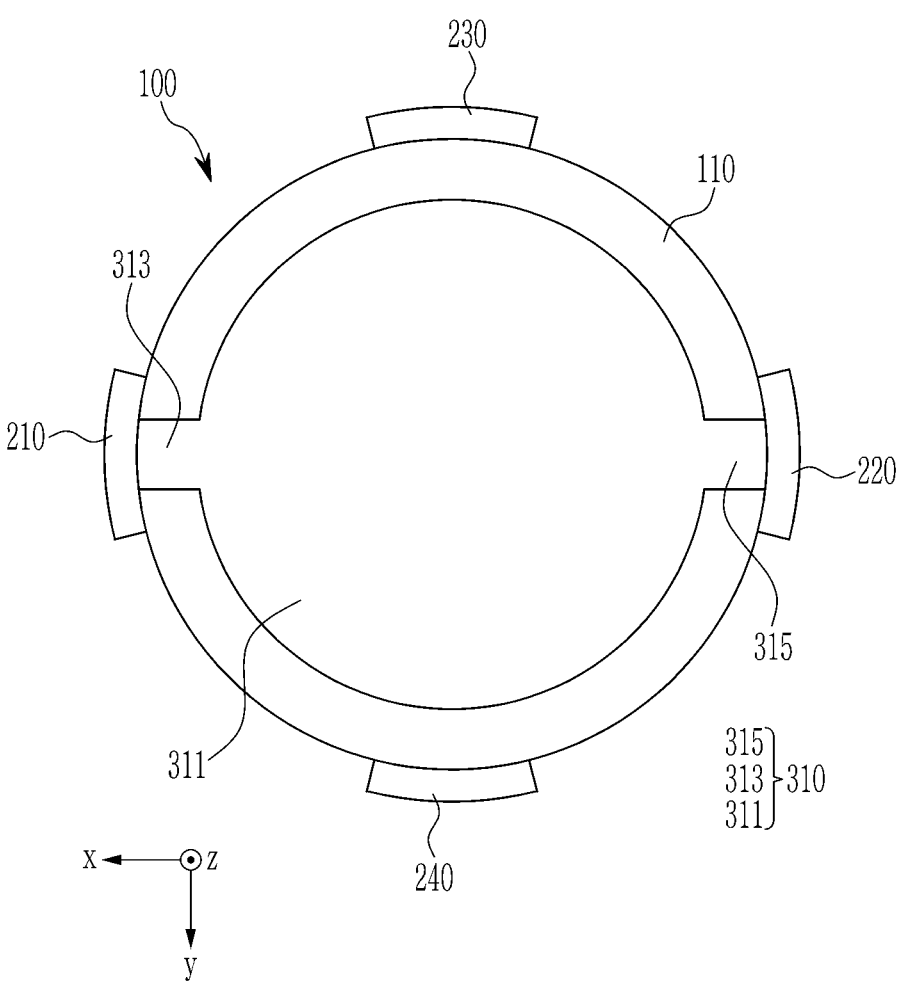
FIG. 4 is a cross-sectional view taken along line IV-IV' of FIG. 2.
Figure 5:
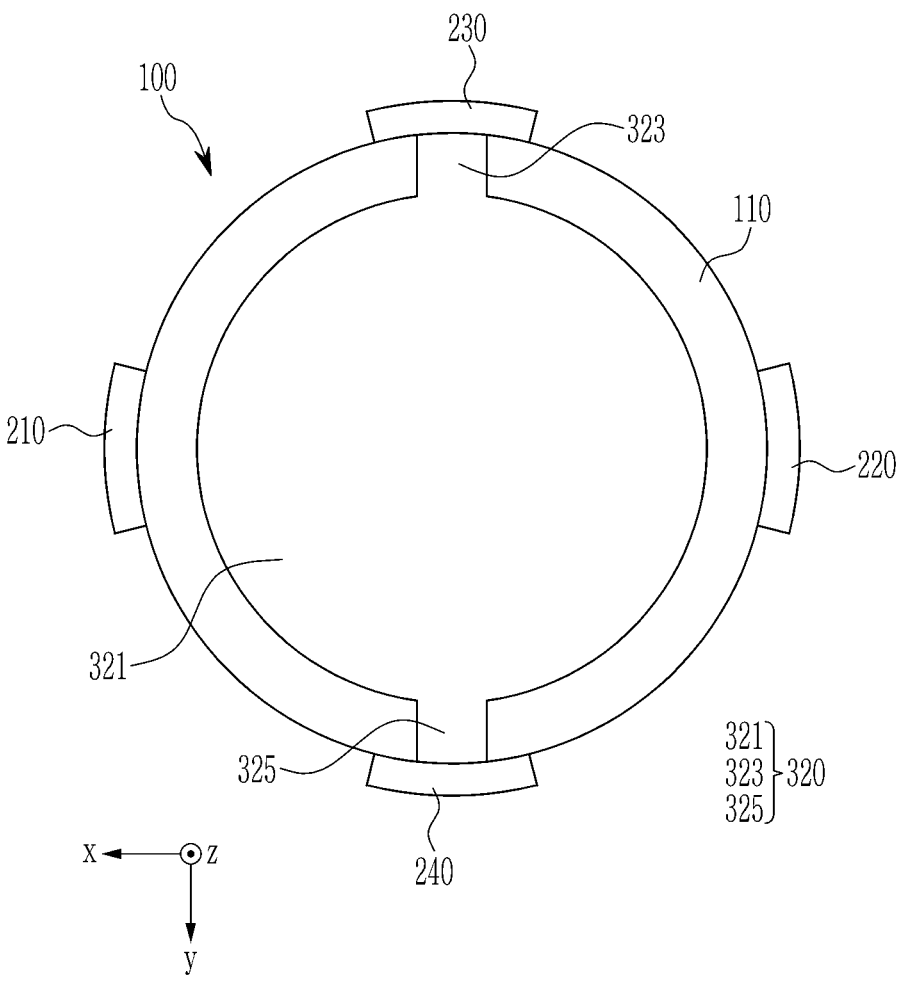
FIG. 5 is a cross-sectional view taken along line V-V' of FIG. 2.
Figure 6:
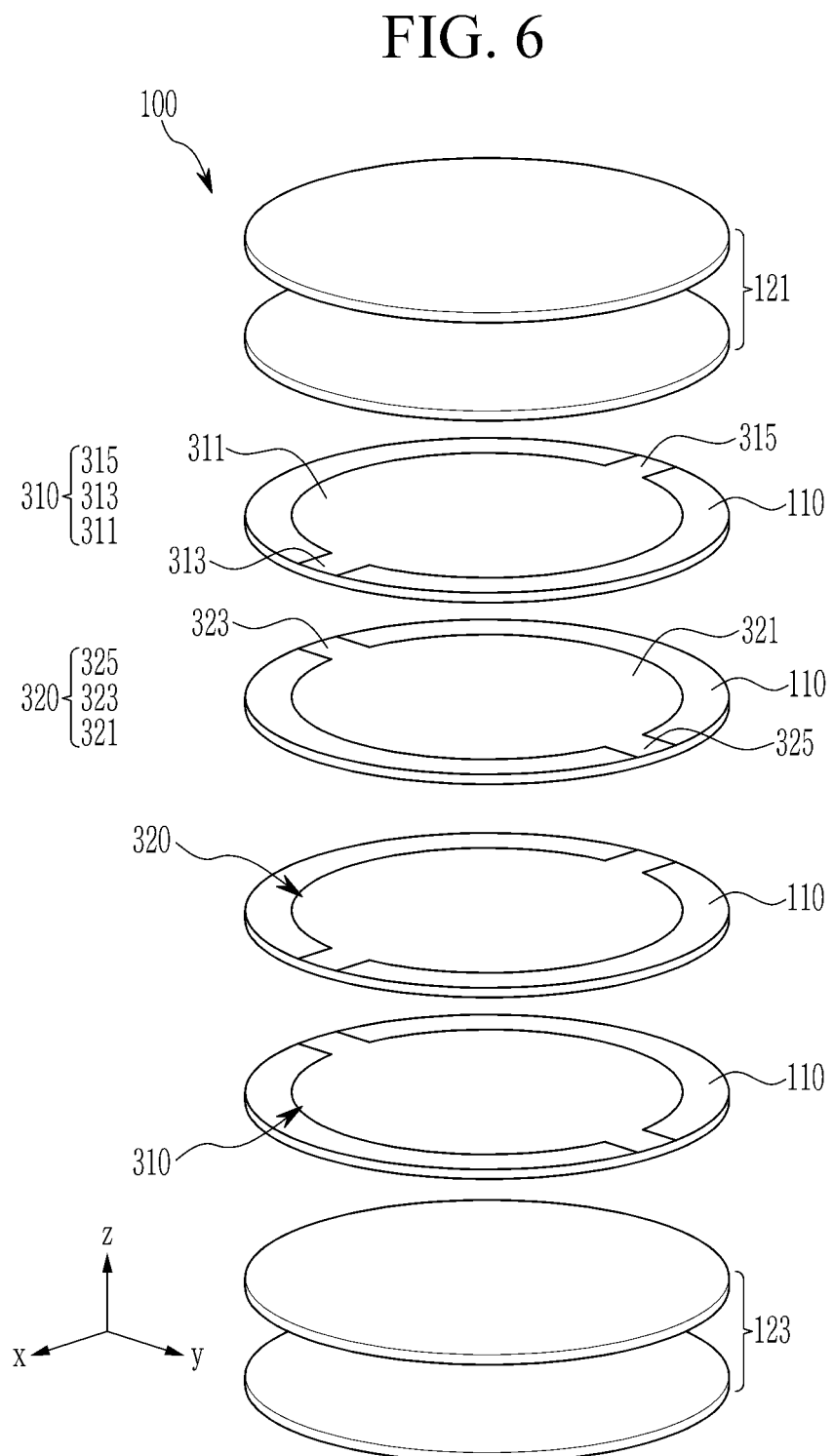
FIG. 6 is an exploded perspective view schematically showing a stacked structure of an internal electrode of the multilayer ceramic electronic component of FIG. 1.

FIG. 1 is a perspective view schematically showing a multilayer ceramic electronic component according to an embodiment, FIG. 2 is a cross-sectional view taken along line II-II' of FIG. 1, FIG. 3 is a cross-sectional view taken along line III-III' of FIG. 1, FIG. 4 is a cross-sectional view taken along line IV-IV' of FIG. 2, FIG. 5 is a cross-sectional view taken along line V-V' of FIG. 2, and FIG. 6 is an exploded perspective view schematically showing a stacked structure of an internal electrode of the multilayer ceramic electronic component of FIG. 1.

Referring to FIG. 1, FIG. 2, FIG. 3, FIG. 4, FIG. 5, and FIG. 6, the multilayer ceramic electronic component 1000 according to the present embodiment includes a stacked body (or a multilayer body) 100 and an external electrode 200.

The stacked body 100 includes a first surface S1, a second surface S2, and a third surface S3.

The first surface S1 and the second surface S2 face each other in a stacking direction (Z-axis direction), and the third surface S3 is a curved surface that connects the first surface S1 and the second surface S2. Since the third surface S3 is a curved surface, an edge of a cross-section of the stacked body 100 that intersects the stacking direction (the Z-axis direction) may form a curved line.

For example, when the first surface S1 and the second surface S2 are viewed from the stacking direction (the Z-axis direction), the first surface S1 and the second surface S2 may have a circular or elliptical shape. In this case, the stacked body 100 may have a circular cylinder or elliptic cylinder shape. A boundary between the first surface S1 and the third surface S3 may be clearly distinguished, and if an edge of the first surface S1 and an edge of the third surface S3 form a curved surface, the boundary may not be clearly distinguished. For example, referring to FIG. 2, the stacked body 100 has a rectangle shape, but a vertex thereof is rounded so that the boundary between the first surface S1 and the third surface S3 is not clearly distinguished. This may be equally applied to a boundary between the second surface S2 and the third surface S3. For example, the above-described round shape may be formed by polishing the boundary between the first surface S1 and the third surface S3 and the boundary between the second surface S2 and the third surface S3.

The stacked body 100 may include a plurality of dielectric layers 110 stacked in the stacking direction (the Z-axis direction). A boundary between the dielectric layers 110 may be unclear. For example, it is difficult to observe the boundary between the dielectric layers 110 without using a scanning electron microscope (SEM), and the plurality of dielectric layers 110 may be viewed as an integral structure.

The dielectric layer 110 may include a ceramic material with a high dielectric constant. For example, the ceramic material may include a dielectric ceramic including an ingredient such as $BaTiO_3$, $CaTiO_3$, $SrTiO_3$, $CaZrO_3$, or the like. The ingredient may further include an auxiliary ingredient such as a manganese (Mn) compound, an iron (Fe) compound, a chromium (Cr) compound, a cobalt (Co) compound, a nickel (Ni) compound, or the like. For example, the dielectric layer includes $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like in which calcium (Ca), zirconium (Zr), or the like is partially dissolved in $BaTiO_3$, but the present disclosure is not limited thereto. As another example, the dielectric layer may include $TiO_2$, $HfO_2$, $Al_2O_3$, AlN, AlSCN, $ZrO_2$, $SiO_2$, MgO, $Si_3N_4$, or the like.

Additionally, the dielectric layer 110 may further include one or more of a ceramic additive, an organic solvent, a plasticizer, a binder, and a dispersant. For example, the ceramic additives may be transition metal oxides or carbides, rare earth elements, magnesium (Mg), aluminun (Al), or the like.

As an example, an average thickness of the dielectric layer 110 may be 0.1 μm to 10 μm, but the present embodiment is not limited thereto.

The stacked body 100 may include a plurality of internal electrodes 300 stacked in the stacking direction (Z-axis direction). The plurality of internal electrodes 300 may include a plurality of first internal electrodes 310 and a plurality of second internal electrodes 320. The first internal electrode 310 and the second internal electrode 320 may be alternately stacked with the dielectric layer 110 interposed therebetween. This stacked structure may be repeated within the stacked body 100, and the internal electrodes closest to the first surface S1 and the second surface S2 of the stacked body 100 may be the first internal electrode 310 or the second internal electrode 320.

The first internal electrode 310 and the second internal electrode 320 may have different polarities, and may be electrically insulated from each other by the dielectric layer 110 disposed therebetween.

The first internal electrode 310 may include a first electrode main body 311, a first lead portion 313, and a second lead portion 315.

The first electrode main body 311 is disposed on a surface of the dielectric layer 110, and is spaced apart from an edge of the dielectric layer 110.

An edge of the first electrode main body 311 may comprise a curved line and may have a circular or elliptical shape when the first electrode main body 311 is viewed from the stacking direction (Z-axis direction), but the present disclosure is not limited thereto.

The first lead portion 313 is disposed at the edge of the first electrode main body 311, and contacts the edge of the dielectric layer 110. That is, the first lead portion 313 is a portion that extends from the first electrode main body 311 to be in contact with the edge of the dielectric layer 110. The portion where the first lead portion 313 contacts the edge of the dielectric layer 110 comprises the third surface S3 of the stacked body 100.

The second lead portion 315 is disposed at the edge of the first electrode main body 311, and contacts the edge of the dielectric layer 110. That is, the second lead portion 315 is a portion that extends from the first electrode main body 311 to be in contact with the edge of the dielectric layer 110. The portion where the second lead portion 315 contacts the edge of the dielectric layer 110 comprises the third surface S3 of the stacked body 100.

The second lead portion 315 is spaced apart from the first lead portion 313. The first lead portion 313 and the second lead portion 315 may be disposed at equal intervals. For example, if the first electrode main body 311 has a circular shape, a line segment connecting the first lead portion 313 and the second lead portion 315 may be a diameter of the circle. As another example, if the first electrode main body 311 has an elliptical shape, the line segment connecting the first lead portion 313 and the second lead portion 315 may be a major axis or a minor axis of the ellipse.

The first lead portion 313 is electrically connected to a first external electrode 210, and the second lead portion 315 is electrically connected to a second external electrode 220.

On the other hand, if necessary, one or more pairs of lead portions may be added to the first internal electrode 310, and a corresponding number of external electrodes may be additionally disposed at the third surface S3 of the stacked body 100.

The second internal electrode 320 may include a second electrode main body 321, a third lead portion 323, and a fourth lead portion 325.

The second electrode main body 321 is disposed on a surface of the dielectric layer 110, and is spaced apart from an edge of the dielectric layer 110.

An edge of the second electrode main body 321 may comprise a curved line and may have a circular or elliptical shape when the second electrode main body 321 is viewed from the stacking direction (Z-axis direction), but the present disclosure is not limited thereto.

The third lead portion 323 is disposed at the edge of the second electrode main body 321, and contacts the edge of the dielectric layer 110. That is, the third lead portion 323 is a portion that extends from the second electrode main body 321 to be in contact with the edge of the dielectric layer 110. The portion where the third lead portion 323 contacts the edge of the dielectric layer 110 comprises the third surface S3 of the stacked body 100.

The fourth lead portion 325 is disposed at the edge of the second electrode main body 321, and contacts the edge of the dielectric layer 110. That is, the fourth lead portion 325 is a portion that extends from the second electrode main body 321 to be in contact with the edge of the dielectric layer 110. The portion where the fourth lead portion 325 contacts the edge of the dielectric layer 110 comprises the third surface S3 of the stacked body 100.

The fourth lead portion 325 is spaced apart from the third lead portion 323. The third lead portion 323 and the fourth lead portion 325 may be disposed at equal intervals. For example, if the second electrode main body 321 has a circular shape, a line segment connecting the third lead portion 323 and the fourth lead portion 325 may be a diameter of the circle. As another example, if the second electrode main body 321 has an elliptical shape, the line segment connecting the third lead portion 323 and the fourth lead portion 325 may be a major axis or a minor axis of the ellipse.

The third lead portion 323 is electrically connected to a third external electrode 230, and the fourth lead portion 325 is electrically connected to a fourth external electrode 240.

On the other hand, if necessary, one or more pairs of lead portions may be added to the second internal electrode 320, and a corresponding number of external electrodes may be additionally disposed at the third surface S3 of the stacked body 100.

The internal electrode 300 may be formed by printing a conductive paste that includes a conductive metal on a surface of the dielectric layer 110. For example, a conductive paste including nickel (Ni) or a nickel (Ni) alloy may be printed on the surface of the dielectric layer using screen printing or gravure printing to form the internal electrode. However, the present embodiment is not limited thereto.

For example, an average thickness of the internal electrode 300 may be within a range of approximately several nm to several μm.

If a voltage is applied to the first external electrode 210, the second external electrode 220, the third external electrode 230, and the fourth external electrode 240, a charge is accumulated between the first internal electrode 310 and the second internal electrode 320 that face each other by the above configuration. That is, capacitance may be obtained between the first internal electrode 310, which is electrically connected to the first external electrode 210 and the second external electrode 220, and the second internal electrode 320, which is electrically connected to the third external electrode 230 and the fourth external electrode 240. Capacitance of the multilayer ceramic electronic component 1000 is proportional to an overlapped area of the first internal electrode 310 and the second internal electrode 320 that overlap each other along the stacking direction (Z-axis direction).

A region where the first internal electrode 310 and the second internal electrode 320 overlap in the stacking direction (the Z-axis direction) may be referred to as an active region, and a cover layer 120 may be disposed outside the active region.

The cover layer 120 may include a first cover layer 121 and a second cover layer 123.

The first cover layer 121 is disposed between the first surface S1 of the stacked body 100 and the internal electrode 300 closest to the first surface S1. The second cover layer 123 is disposed between the second surface S2 of the stacked body 100 and the internal electrode 300 closest to the second surface S2.

The first cover layer 121 and the second cover layer 123 may have the same composition as that of the dielectric layer 110. The cover layer may be formed by stacking one or more dielectric layers on an outer surface of the uppermost internal electrode and an outer surface of the lowermost internal electrode.

The first cover layer 121 and the second cover layer 123 may serve to prevent damage to the internal electrode 300 due to a physical or chemical stress.

The external electrode 200 is disposed outside the stacked body 100.

The external electrode 200 may include the first external electrode 210, the second external electrode 220, the third external electrode 230, and the fourth external electrode 240.

The first external electrode 210, the second external electrode 220, the third external electrode 230, and the fourth external electrode 240 may be disposed at the third surface S3 of the stacked body 100 to be spaced apart from each other. For example, the first external electrode 210, the second external electrode 220, the third external electrode 230, and the fourth external electrode 240 may be disposed at equal intervals on the third surface S3.

At least one of the first external electrode 210, the second external electrode 220, the third external electrode 230, and the fourth external electrode 240 may extend onto a portion of at least one of the first surface S1 and the second surface S2 of the stacked body 100. That is, the external electrode 200 may extend onto a portion of the first surface S1 of the stacked body 100 and a portion of the second surface S2 of the stacked body 100, may extend only onto the portion of the first surface S1, or may extend only onto the portion of the second surface S2.

The first external electrode 210 may include a first metal layer 211, a second metal layer 213, and a third metal layer 215. The first metal layer 211 may be connected to the first internal electrode 310, the second metal layer 213 may cover the first metal layer 211, and the third metal layer 215 may cover the second metal layer 213. The first metal layer 211 may include copper (Cu), the second metal layer 213 may include nickel (Ni), and the third metal layer 215 may include tin (Sn). However, the present embodiment is not limited thereto. Meanwhile, the second external electrode 220, the third external electrode 230, and the fourth external electrode 240 may have the same structure and composition as those of the first external electrode 210 described above.

Figure 7:
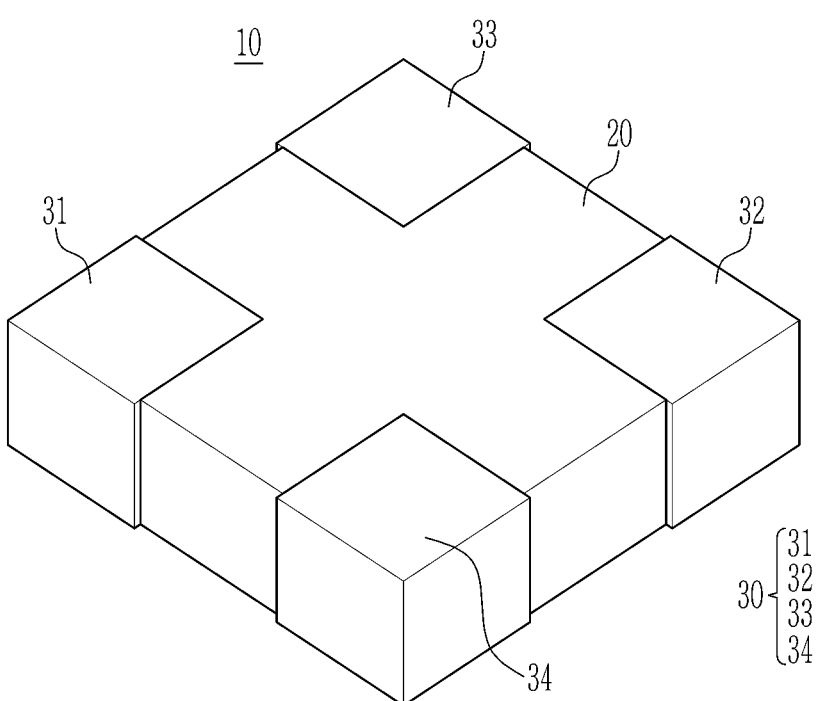
FIG. 7 is a perspective view schematically showing a multilayer ceramic electronic component according to a comparative example.

FIG. 7 is a perspective view schematically showing a multilayer ceramic electronic component according to a comparative example.

Referring to FIG. 7, the multilayer ceramic electronic component 10 according to the comparative example includes a stacked body 20 and an external electrode 30. The stacked body 20 has a rectangular parallelepiped shape, and the external electrode 30 includes a first external electrode 31, a second external electrode 32, a third external electrode 33, and a fourth external electrode 34. The stacked body 20 has the rectangular parallelepiped shape so that it has eight vertices and twelve edges. Since the vertices and the edges have a very small area, they can break easily when external pressure is applied.

On the other hand, the stacked body 100 of the multilayer ceramic electronic component 1000 according to the present embodiment may have a circular cylinder or elliptic cylinder shape. The structure does not have a portion corresponding to a vertex of the rectangular parallelepiped and has fewer edges. Therefore, even if an external impact is applied to the multilayer ceramic electronic component according to the present embodiment, a risk of breakage is not high. Furthermore, if the edges of the stacked body are polished to a rounded shape, the risk of breakage may be reduced.

Figure 8:
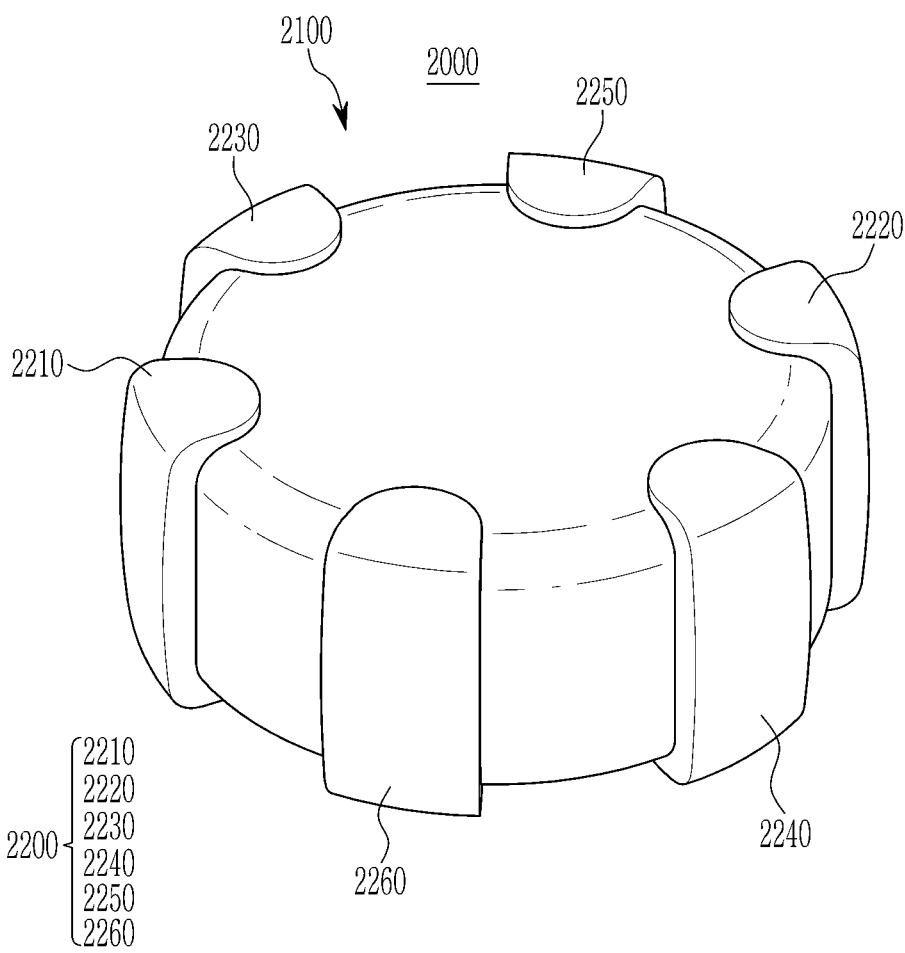
FIG. 8 is a perspective view schematically showing a multilayer ceramic electronic component according to another embodiment.
Figure 9:
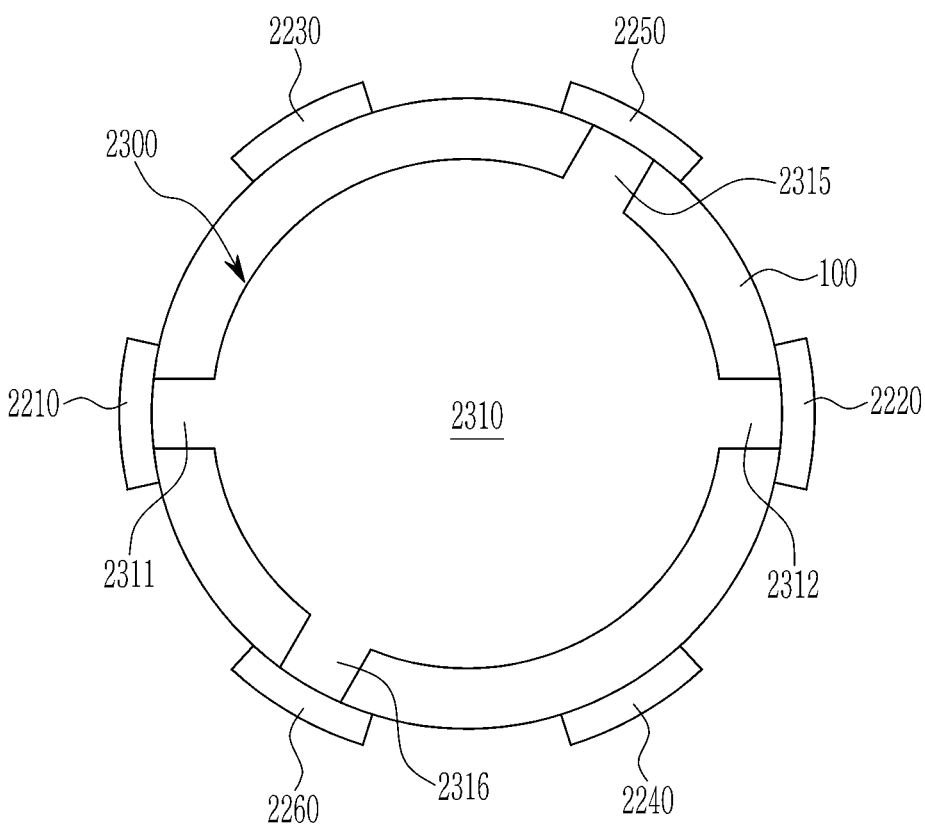
FIG. 9 is a cross-sectional view schematically showing a first internal electrode of the multilayer ceramic electronic component of FIG. 8.
Figure 10:
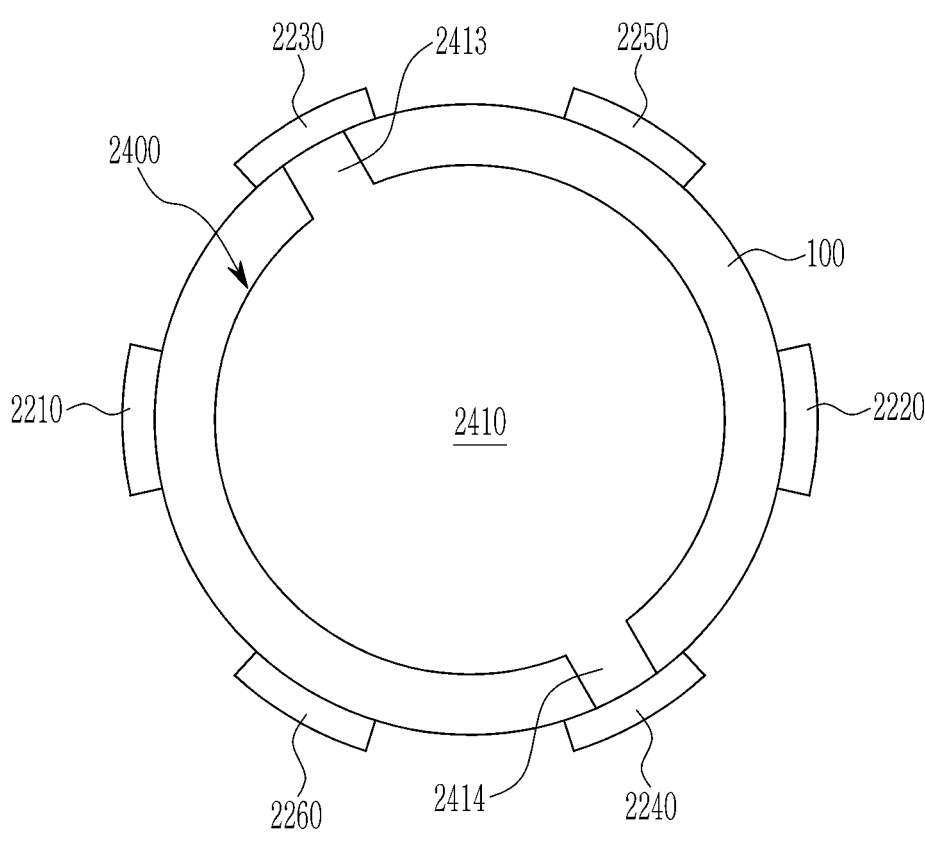
FIG. 10 is a cross-sectional view schematically showing a second internal electrode of the multilayer ceramic electronic component of FIG. 8.

FIG. 8 is a perspective view schematically showing a multilayer ceramic electronic component according to another embodiment, FIG. 9 is a cross-sectional view schematically showing a first internal electrode of the multilayer ceramic electronic component of FIG. 8, and FIG. 10 is a cross-sectional view schematically showing a second internal electrode of the multilayer ceramic electronic component of FIG. 8.

Referring to FIG. 8, FIG. 9, and FIG. 10, the multilayer ceramic electronic component 2000 may include a stacked body 2100 and an external electrode 2200.

A first internal electrode 2300 may include a first electrode main body 2310, a first lead portion 2311, a second lead portion 2312, a fifth lead portion 2315, and a sixth lead portion 2316.

The first lead portion 2311 is electrically connected to a first external electrode 2210, and the second lead portion 2312 is electrically connected to a second external electrode 2220. Additionally, the fifth lead portion 2315 is electrically connected to a fifth external electrode 2250, and the sixth lead portion 2316 is electrically connected to a sixth external electrode 2260.

On the other hand, if necessary, one or more pairs of lead portions may be added to the first internal electrode 2300, and a corresponding number of external electrodes may be additionally disposed.

A second internal electrode 2400 may include a second electrode main body 2410, a third lead portion 2413, and a fourth lead portion 2414. That is, the number of lead portions included in the first internal electrode 2300 and the number of lead portions included in the second internal electrode 2400 may be different from each other.

The third lead portion 2413 is electrically connected to a third external electrode 2230, and the fourth lead portion 2414 is electrically connected to a fourth external electrode 2240.

On the other hand, if necessary, one or more pairs of lead portions may be added to the second internal electrode 2400, and a corresponding number of external electrodes may be additionally disposed.

The remaining components except for the above components are the same as those of the multilayer ceramic electronic component shown in FIG. 1, and, therefore, a redundant description thereof will be omitted.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

1000, 2000: multilayer ceramic electronic component
100, 2100: stacked body
110: dielectric layer
120: cover layer
200, 2200: external electrode
210, 2210: first external electrode
211, 221, 231, 241: first metal layer
213, 223, 233, 243: second metal layer
215, 225, 235, 245: third metal layer
220, 2220: second external electrode
230, 2230: third external electrode
240, 2240: fourth external electrode
300: internal electrode
310, 2300: first internal electrode
311, 2310: first electrode main body
313, 2311: first lead portion
315, 2312: second lead portion
320, 2400: second internal electrode
321, 2410: second electrode main body
323, 2413: third lead portion
325, 2414: fourth lead portion
2250: fifth external electrode
2260: sixth external electrode
2315: fifth lead portion
2316: sixth lead portion

What is claimed is:

1. A multilayer ceramic electronic component, comprising:
   a stacked body that includes a plurality of dielectric layers stacked in a first direction and a plurality of internal electrodes stacked in the first direction; and
   a first external electrode, a second external electrode, a third external electrode, and a fourth external electrode that are disposed outside the stacked body,
   wherein the plurality of internal electrodes includes a plurality of first internal electrodes connected to the first external electrode and the second external electrode and a plurality of second internal electrodes connected to the third external electrode and the fourth external electrode, and an edge of a cross-section of the stacked body that intersects the first direction is a curve,
   wherein the stacked body includes a first surface and a second surface facing in the first direction and a third surface connecting the first surface and the second surface, and the third surface is a curved surface, and
   wherein the stacked body has a circular cylinder or elliptic cylinder shape.

2. The multilayer ceramic electronic component of claim 1, wherein at least one of a boundary between the first surface and the third surface and a boundary between the second surface and the third surface is a round shape.

3. The multilayer ceramic electronic component of claim 1, wherein the first external electrode, the second external electrode, the third external electrode, and the fourth external electrode are disposed on the third surface of the stacked body.

4. The multilayer ceramic electronic component of claim 3, wherein at least one of the first external electrode, the second external electrode, the third external electrode, and the fourth external electrode extends onto a portion of at least one of the first surface and the second surface of the stacked body.

5. The multilayer ceramic electronic component of claim 3, wherein the first external electrode, the second external electrode, the third external electrode, and the fourth external electrode are disposed at equal intervals.

6. The multilayer ceramic electronic component of claim 1, wherein the stacked body includes a structure in which the plurality of first internal electrodes and the plurality of second internal electrodes are alternately stacked with the respective dielectric layers interposed therebetween.

7. The multilayer ceramic electronic component of claim 1, wherein one of the first internal electrodes includes a first electrode main body and a first lead portion and a second lead portion that are disposed at an edge of the first electrode main body and are spaced apart from each other, and each of the second internal electrodes includes a second electrode main body and a third lead portion and a fourth lead portion that are disposed at an edge of the second electrode main body and are spaced apart from each other.

8. The multilayer ceramic electronic component of claim 7, wherein the first lead portion is connected to the first external electrode and the second lead portion is connected to the second external electrode, and the third lead portion is connected to the third external electrode and the fourth lead portion is connected to the fourth external electrode.

9. The multilayer ceramic electronic component of claim 8, further comprising a fifth external electrode and a sixth external electrode, wherein the one of the first internal electrodes further includes a fifth lead portion and a sixth lead portion that are disposed at the edge of the first electrode main body and are spaced apart from the first lead portion and the second lead portion, and the fifth lead portion is connected to the fifth external electrode and the sixth lead portion is connected to the sixth external electrode.

10. The multilayer ceramic electronic component of claim 7, wherein the first lead portion and the second lead portion are disposed at equal intervals.

11. The multilayer ceramic electronic component of claim 10, wherein the third lead portion and the fourth lead portion are disposed at equal intervals.

12. The multilayer ceramic electronic component of claim 7, wherein when the first electrode main body and the second electrode main body are viewed from the first direction, the first electrode main body and the second electrode main body have a circular or elliptical shape.

13. The multilayer ceramic electronic component of claim 1, wherein each of the first external electrode and the second external electrode includes a first metal layer connected to the plurality of first internal electrodes, a second metal layer covering the first metal layer, and a third metal layer covering the second metal layer, and each of the third external electrode and the fourth external electrode includes a first metal layer connected to the plurality of second internal electrodes, a second metal layer covering the first metal layer, and a third metal layer covering the second metal layer.

14. The multilayer ceramic electronic component of claim 13, wherein the first metal layer includes copper (Cu), the second metal layer includes nickel (Ni), and the third metal layer includes tin (Sn).

15. A multilayer ceramic electronic component, comprising:

a stacked body having a cylindrical shape and including a plurality of dielectric layers stacked in a first direction and a plurality of internal electrodes stacked in the first direction; and a first external electrode, a second external electrode, a third external electrode, and a fourth external electrode that are disposed outside the stacked body, wherein the plurality of internal electrodes includes a plurality of first internal electrodes connected to the first external electrode and the second external electrode and a plurality of second internal electrodes connected to the third external electrode and the fourth external electrode, and wherein the stacked body includes a first surface and a second surface facing in the first direction and a third surface connecting the first surface and the second surface, and the third surface is a curved surface.

16. The multilayer ceramic electronic component of claim 15, wherein one of the first internal electrodes includes a first electrode main body and a first lead portion and a second lead portion that are disposed at an edge of the first electrode main body and are spaced apart from each other, and each of the second internal electrodes includes a second electrode main body and a third lead portion and a fourth lead portion that are disposed at an edge of the second electrode main body and are spaced apart from each other.

17. The multilayer ceramic electronic component of claim 16, wherein the first lead portion is connected to the first external electrode and the second lead portion is connected to the second external electrode, and the third lead portion is connected to the third external electrode and the fourth lead portion is connected to the fourth external electrode.

18. The multilayer ceramic electronic component of claim 17, further comprising a fifth external electrode and a sixth external electrode that are spaced apart from each of the first, second, third, and fourth external electrodes, wherein the one of the first internal electrodes further includes a fifth lead portion and a sixth lead portion that are disposed at the edge of the first electrode main body and are spaced apart from the first lead portion and the second lead portion, and the fifth lead portion is connected to the fifth external electrode and the sixth lead portion is connected to the sixth external electrode.

\* \* \* \* \*